United States Patent
Balan et al.

(10) Patent No.: US 7,916,658 B2
(45) Date of Patent: *Mar. 29, 2011

(54) METHOD FOR CONGESTION DETECTION IN PACKET TRANSMISSION NETWORKS

(75) Inventors: Radu Victor Balan, Rockville, MD (US); Chih-Wei Huang, Seattle, WA (US); Justinian Rosca, West Windsor, NJ (US); Octavian Sarca, Aurora (CA)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 141 days.

This patent is subject to a terminal disclaimer.

(21) Appl. No.: 12/206,069

(22) Filed: Sep. 8, 2008

(65) Prior Publication Data

US 2009/0141650 A1 Jun. 4, 2009

Related U.S. Application Data

(60) Provisional application No. 60/986,379, filed on Nov. 8, 2007.

(51) Int. Cl.
*G06F 11/30* (2006.01)
*H04L 12/56* (2006.01)

(52) U.S. Cl. ........................ 370/252; 370/235

(58) Field of Classification Search .............. 370/252, 370/229, 230–235

See application file for complete search history.

(56) References Cited

U.S. PATENT DOCUMENTS

| | | | |
|---|---|---|---|
| 5,193,151 A * | 3/1993 | Jain ..................... | 709/237 |
| 6,498,781 B1 * | 12/2002 | Bass et al. ................ | 370/230.1 |
| 7,180,857 B2 * | 2/2007 | Kawakami et al. .......... | 370/231 |
| 2002/0089930 A1 * | 7/2002 | Aceves et al. ............... | 370/230 |
| 2002/0186657 A1 * | 12/2002 | Jain et al. ...................... | 370/235 |
| 2004/0090916 A1 * | 5/2004 | Hosein ....................... | 370/235 |
| 2005/0052994 A1 * | 3/2005 | Lee ........................... | 370/230 |
| 2007/0076626 A1 * | 4/2007 | Wise et al. .................. | 370/252 |
| 2008/0144500 A1 * | 6/2008 | Chen et al. .................. | 370/235 |
| 2009/0003210 A1 * | 1/2009 | Jakobsen et al. ............. | 370/235 |
| 2009/0059795 A1 * | 3/2009 | Fonseca et al. .............. | 370/236 |

* cited by examiner

*Primary Examiner* — Kwang B Yao
*Assistant Examiner* — Candal Elpenord
(74) *Attorney, Agent, or Firm* — Buchanan Ingersoll & Rooney PC (57) ABSTRACT

A method for measuring degree of packet congestion on a channel of a packet communication network. The method includes: during a training mode, generating an mathematical relationship between the degree of packet congestion on the channel and a plurality of measurable features of the network over a plurality of network conditions; and, during a subsequent normal operating mode, periodically measuring the plurality of measurable features and applying the generated mathematical relationship to such periodically measured plurality of measurable features to determine actual degree of congestion on the channel; and comparing the actual degree of congestion on the channel with a predetermined channel congestion threshold level. The degree of packet congestion on the channel is saturation level. The measurable features include: time delay between transmission starts and terminations of the previously transmitted packet; the fraction of time the channel is busy; and, average number of packet transmission retries.

17 Claims, 7 Drawing Sheets

METHOD FOR CONGESTION DETECTION IN PACKET TRANSMISSION NETWORKS

CROSS-REFERENCE TO RELATED APPLICATIONS

This application claims priority from U.S. Provisional application No. 60/986,379 filed Nov. 8, 2007, the entire subject matter thereof being incorporated herein by reference.

TECHNICAL FIELD

This invention relates generally to packet transmission networks and more particularly to methods for detecting congestion on such networks.

BACKGROUND AND SUMMARY

As is known in the art, one type of packet transmission network is a wireless transmission network. As is also known, Wireless Local Area Networks (WLAN) are becoming more and more popular nowadays due to their easy deployment and wide spread of WiFi interface cards. A Wi-Fi Alliance report finds that 1.2 million 802.11 chipsets will be produced in 2006. Parallel to technological development, a flurry of analytical studies appeared in communication literature. Experimental results and theoretical studies show that wireless networks may enter a saturation regime characterized by a highly suboptimal medium utilization. More specifically, standard rate adaptation mechanisms reduce transmission rates when multiple packet loss occurs. Yet if the packet loss is due to collision rather than bad channel (which is the working assumption for the rate adaptation mechanism) then the controller induces a higher probability of collision which snowballs in turn into an even lower throughput. Such a mechanism is used by the Automatic Rate Fallback (ARF) algorithm used in WLAN-II products from Lucent which assumes all packet loss are due to bad channel.

Here, a method is provided for detecting when saturation occurs in 802.11 wireless networks. The method computes a simple, efficiently computable, formula based on "saturation", as described below, discriminating features as inputs in order to predict saturation. The formula represents a classification boundary of saturation vs. non-saturation. The system classification boundary of saturation vs. non-saturation evolves from level curves with respect to load, interference or frame error rates, and the more the one of these conditions worsens the more the saturation boundary is approached. The consequences are very important in determining that the system approaches saturation, and also determining the cause of saturation: bad channel conditions or congestion or both.

Consider an 802.11e network formed of an Access Point (AP), and several stations (STA's). We will consider several Access Categories (AC) of the four AC's specified in 802.11e standard.

In the following, several scenarios are presented and comment on each of them if, and when, saturation is reached:

A. Single Connection (i.e. One Way)

Assume there is only one AP and one STA, and except for control frames, the data is transmitted only on the uplink, AP to STA (or, alternatively, only on the downlink, STA to AP). At low load, throughput is proportional to the load. The throughput then increases monotonically with load (load is MAC layer packet arrival rate at sender from its application layer). Starting with some load, the throughput remains constant indicating a plateau. However for the purpose of this project, this behavior is not considered saturation.

One characteristics of saturation (in our interpretation) is having packet collisions. In the one-link case there are no packet collisions (except maybe with interferers, which are not considered in this scenario), and as such, this case is not representative to saturation.

B. Link vs. Network

Consider the following scenario: the BSS (Basic service set) has three stations (STAs): two with high loads, and a third STA with a low load. The two STAs compete for the channel, and in this process create many packet collisions (and retransmissions). The third station, even though its packet transmissions may suffer multiple retransmissions, achieves the desired throughput, albeit with a larger delay. By increasing the first two STA loads the total throughput achieves a maximum value after which it decreases substantially by the cascading effect mentioned above. Then the saturation limit is achieved. The third station link throughput may not be affected. However, consider this case as network saturation.

A conclusion of this case is that saturation is a property of the network and not of individual links. Thus the network can be in saturation or not, and not a particular link.

C. Packet Collisions and Saturation

Consider a typical network scenario: one access point (AP) and several STAs. For moderate loads, when throughput is still a monotonically increasing function of load, packets may suffer collisions with some rate. An increase in the loads will produce an increase in the packet collision rate. Once the peak throughput is achieved, the packet collision rate keeps increasing with the load, however the throughput starts decreasing toward its saturation value.

Thus, the packet collision rate is a proxy for STAs loads and may be a good indicator of the presence of saturation.

All these aspects of the problem suggest the following definition of saturation:

A wireless network is in saturation if there is a set of decreases in the packet arrival rates at each station's MAC that produces an increase in the total throughput.

In accordance with the present invention, a method is provided for measuring degree of packet congestion on a channel of a packet communication network. The method includes: during a training mode, generating a mathematical relationship between the degree of packet congestion on the channel and a plurality of measurable features of the network over a plurality of network conditions; and, during a subsequent normal operating mode, periodically measuring the plurality of measurable features and applying the generated mathematical relationship to such periodically measured plurality of measurable features to determine actual degree of congestion on the channel.

In one embodiment, the degree of packet congestion on the channel is saturation level of the channel.

In one embodiment, saturation level is a function of packet arrival rate at a receiver on the channel and total packet throughput on the channel.

In one embodiment, the function is that if there is a set of decreases in the packet arrival rates at each receiver that produces an increase in the total throughput, the channel is at the saturation level of the channel.

In one embodiment, the measurable features of the network include at least one of: time delay between transmission starts of a station on the channel and terminations of the previously transmitted packet from such station; the fraction of time the channel is busy with transmissions, regardless of the origin of the transmission, or whether packets were correctly transmitted and received; and, average number of packet transmission retries on the channel.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2(*a*)-2(*c*) are used to define interference for three cases: The first case FIG. 2(*a*) is ignored if the interference period is short and falls within a data packet transmission duration; In the other two cases (FIGS. 2(*b*) and 2(*c*)), the data packet is either collided or deferred due to the busy channel resulting from the interference.

Like reference symbols in the various drawings indicate like elements.

DETAILED DESCRIPTION

Figure 1:
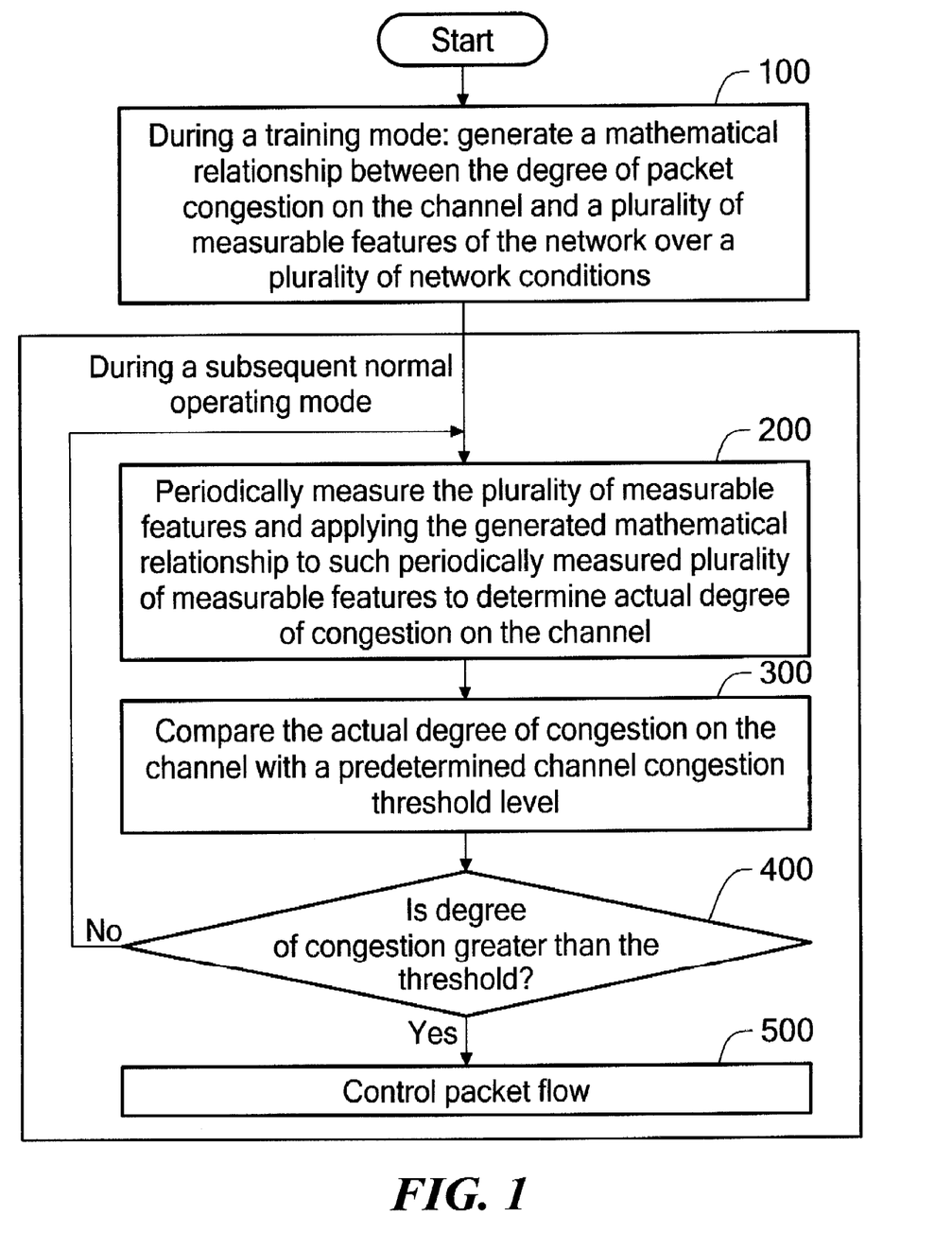
FIG. 1 is a flowchart of the method for measuring degree of packet congestion on a channel of a packet communication network according to the invention.

Referring now to FIG. 1, a flowchart of the method for measuring degree of packet congestion on a channel of a packet communication network according to the invention is shown. In Step 100, during a training mode, the method generates a mathematical relationship between the degree of packet congestion on the channel and a plurality of measurable features of the network over a plurality of network conditions. In Step 200, during a subsequent normal operating mode, the method periodically measures the plurality of measurable features and applying the generated mathematical relationship to such periodically measured plurality of measurable features to determine actual degree of congestion on the channel. Next, in Step 300, the method compares the actual degree of congestion on the channel with a predetermined channel congestion threshold level.

Here, the degree of packet congestion on the channel is saturation level of the channel where saturation level is a function of packet arrival rate at a receiver on the channel and total packet throughput on the channel. The function is that if there is a set of decreases in the packet arrival rates at each receiver that produces an increase in the total throughput, the channel is at the saturation level of the channel.

Here, for example, the measurable features of the network include at least one of: time delay between transmission starts of a station on the channel and terminations of the previously transmitted packet from such station; the fraction of time the channel is busy with transmissions, regardless of the origin of the transmission, or whether packets were correctly transmitted and received; and, average number of packet transmission retries on the channel.

| Definition of Terms and Symbols | | |
|---|---|---|
| Terms/Symbol | Description | Unit |
| Time Utilization (TU) | The fraction of time that the channel is busy | |
| System Loading (L) | Total data loading of the system from applications | bps |
| Goodput (GP) | The ACK'd data transmitted over the channel | bps |
| Congestion | The network condition with high time utilization | |
| Queuing Delay (QD) | The amount of time that a packet stay in the interface queue | ms |
| Medium Access Dealy (MAD) | Total transmission time - queuing delay | ms |
| Wireless FER (FER) | The frame error rate due to bad wireless channel quality | % |
| N | Number of client stations | |
| InfAr | Average arrival time between two interfering signals | ms |
| InfDu | Average duration of interfering signals | ms |
| S | IP packet size = data payload + 40 | bytes |
| AC[n] | 802.11e priority access category. From high to low n = 0, 1, 2, 3. | |

Below, we consider a number of features essential in detecting saturation. Other features could also be used in our approach; however we consider that this is a sufficient set of features to result in a good saturation detector and illustrate our concept and an instantiation of the concept:

1. Medium Access Delay (MAD)

Different chipsets offer various statistics about the operation of the hardware. In our formulas we will consider instantiations corresponding to the parameters reported by the Atheros AR5212 chipset hardware (manufactured by Atheros Communications, Inc. 5480 Great America Parkway Santa Clara, Calif. 95054) that can be used to calculate channel usage. In other implementations/hardware, similar statistics can be found or computed. These are:

TFC register counts the number of cycles the tx_frame signal is Active; AR5212: 9.8.1 (170), AppNote-RxTx-Profiling: 9.8.1(1)

RFC register counts the number of cycles the rx_frame signal is Active; AR5212: 9.8.2 (170), AppNote-RxTx-Profiling: 9.8.2(1)

RRC register counts the number of cycles the rx_clear signal is Active; AR5212: 9.8.3 (170), AppNote-RxTx-Profiling: 9.8.3(2)

Medium Access Delay (MAD) is defined based on the following times:

t0 denotes the time a packet is placed in the interface queue (CC)

t1 denotes the time when packet is taken from interface queue and the transmission mechanism begins t2 denotes the time when transmission ends (SendTimeStamp)

Generally we know only t0 and t2, however the following formula can be used to compute t1:

$$t1(n) = \max(t0(n), t2(n-1))$$

which reflects the fact that, transmission starts as soon as the transmission of the previous packet ended, provided the current packet arrived.

MAD is defined as the average of t2−t1 over N packets:

$$MAD = \frac{1}{N}\sum_{k=1}^{N}(t2(n)-t1(n))$$

2. Time Utilization (TU)

Time Utilization (TU) measures the fraction of time the medium is busy with wireless transmissions, regardless of the origin, or whether packets were correctly transmitted/received. Thus, if T1 and T2 denote the starting, respectively the ending time for an observation period (e.g. 5 seconds), and that the RRC clear channel counter is incremented when the medium is idle, then:

$$TU = 1 - \frac{RRC(T2)-RRC(T1)}{T2-T1}$$

Alternatively, the time utilization can be computed from the TFC and RFC register counters, which indicate the number of cycles transmission and reception flags are active over time:

$$TU = \frac{TFC(T2)+RFC(T2)-TFC(T1)-RFC(T1)}{T2-T1}$$

For practical implementations, we have to explore the most accurate alternative. For different chipsets, alternative flags may enable us to compute TU.

3. Average Number of Retries (R)

Average Number of Retries (R) represents the average of DataFailCnt over a number of N packets:

$$R = \frac{1}{N}\sum_{k=1}^{N}DataFailCnt(k)$$

Initial Training Data Generation, Step 100

Here, ns-2 code and perl scripts were written to simulate behavior of the network topologies of interest, or to measure the parameters of interest from real experimentation. We considered one AP and several stations with non-perfect channel conditions and interference.

Simulation Outline

In simulation, we have controlled these factors as follows:

Channel condition is modeled through considering a Frame Error Rate (FER). FER acts as an independent variable and contributes to an increased number of retransmissions.

Interference is modeled as a Poisson arrival process of random duration. Time length for the on-state is an exponentially distributed random variable. When interference overlaps with a packet transmission, that transmission is considered corrupt. Interference contributes to all medium access delay (MAD), number of retries, and channel utilization. The interference is specified with two parameters: the Poisson process arrival rate, and the average on-state duration.

Simulation Results: Balanced Network with Several Levels of Interference and Frame Error Rates (FER)

Following parameters are varied in simulation to cover various possible conditions:

System loading in numbers of client VoIP/Video streaming stations (N).

Channel quality in terms of FER under various corresponding SNRs.

Interference: external, representing hidden nodes etc. Interference is modeled as a Poisson arrival process with rate $Intf_{Ar}$, and duration exponentially distributed with an average time $Intf_{Du}$ Traffic type (i.e. packet size S, access category)

Figure 2A:
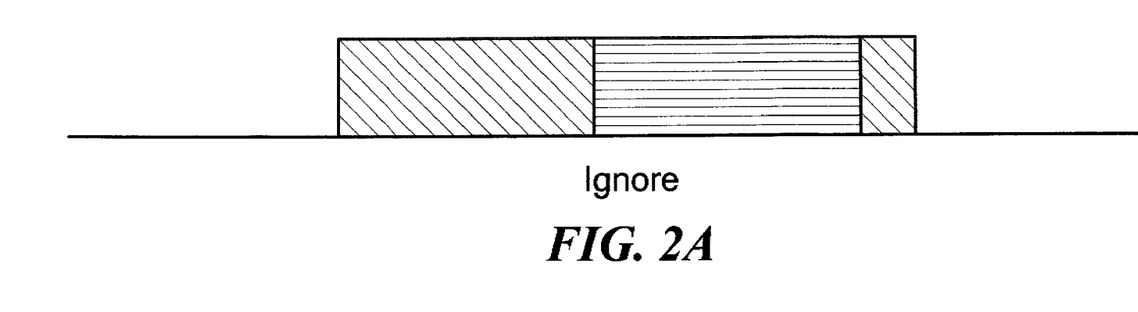
Figure 2B:
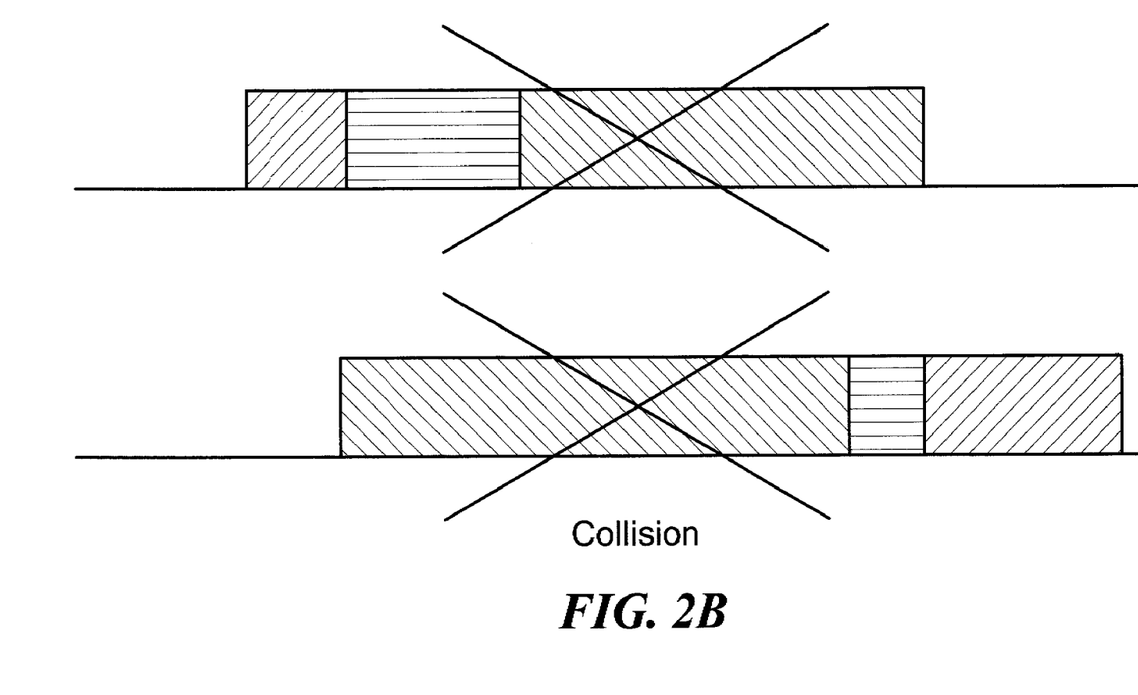
Figure 2C:
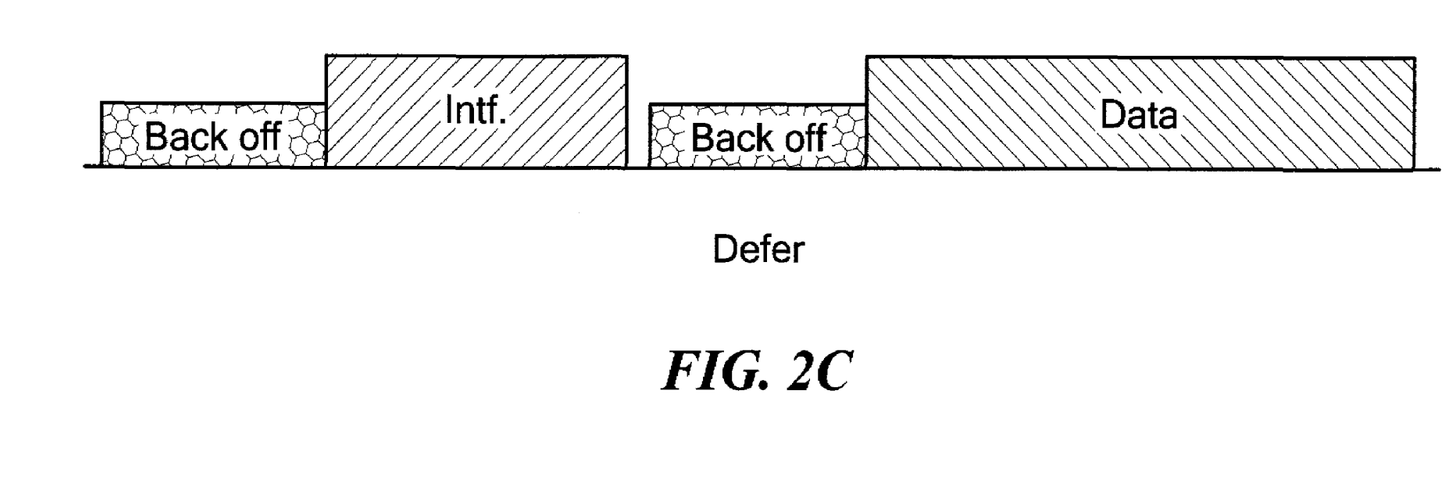

In simulation, interference is defined as in FIG. 2, for three cases. The first case (a) is ignored if the interference period is short and falls within a data packet transmission duration. In other two cases (b) and (c), the data packet is either collided or deferred due to the busy channel resulting from the interference. The effect is controlled by average arrival time $Intf_{Ar}$ and duration $Intf_{Du}$ assuming they are independent and exponentially distributed between any two interference periods.

The simulation aims at computing the following measures: Goodput GP, MAD, TU, Rt. For a fixed FER, interference level, and S/traffic type, we derived GP(N), TU(N).

Overall, the results below cover 420 simulations, for various values of the discussed parameters: N, FER, InfAr, InfDu. Below we give a complete description of all these parameters, and some of the quantities tracked in simulation.

The simulation topology used is:

Infrastructure Mode

N={1 2 3 4 5 6 7 8 9 10 11 12 13 14 15}
FER={0 1 5 10 20 50 80}
InfAr={INF 200 100 50}
Infu={1}
S={200}

| Layer | Parameters |
| --- | --- |
| Application | Two-way VoIP traffic at AC[0] |
|  | Simulate G.711 codec at 64 Kbps |
| Transport | IP/UDP/RTP |
|  | 40 bytes/packet of header |
|  | 80 Kbps, S = 200 bytes/packet, 20 ms/packet with header each direction |
| Link/MAC | 802.11e AC[0]: AIFS = 2, CWmin = 8, CWmax = 16, RetryLimit = 4 |
|  | 802.11e AC[1]: AIFS = 2, CWmin = 16, CWmax = 32, RetryLimit = 4 |
| Physical | 802.11b at 11 Mbps |

Considering now how operation points (before or after saturation) are positioned in the joint space TU vs. MAD vs. Rt, it is first noted that simulation obtains undefined values for MAD and Rt when the interference is too bad and no frame starts to transmit within the simulation time. This induces some outliers in the plots, which should be discarded. Their positions, however, are obvious.

The saturation detector is based on the following rule:

The Goodput GP maximum corresponds to a Nmax=Nmax (FER,Interference,S). In the feature space (MAD,TU, Rt) data labeled 'o' represents all experiments, or "operating points", before Nmax, and data labeled 'x' represent all experiments at or after Nmax+1. Thus, we have maximum number of clients for which a decrease in the load induces an increase in the total throughput, according to the original definition for saturation presented above. When one traces the actual state of the wireless system in the feature space, one can observe the data label (o or x) of (known) neighboring states, and then infer the data label (o or x) of the current state based on proximity to such known states. This is equivalent to classifying the current state as saturated or non-saturated based on proximity.

Figure 3:
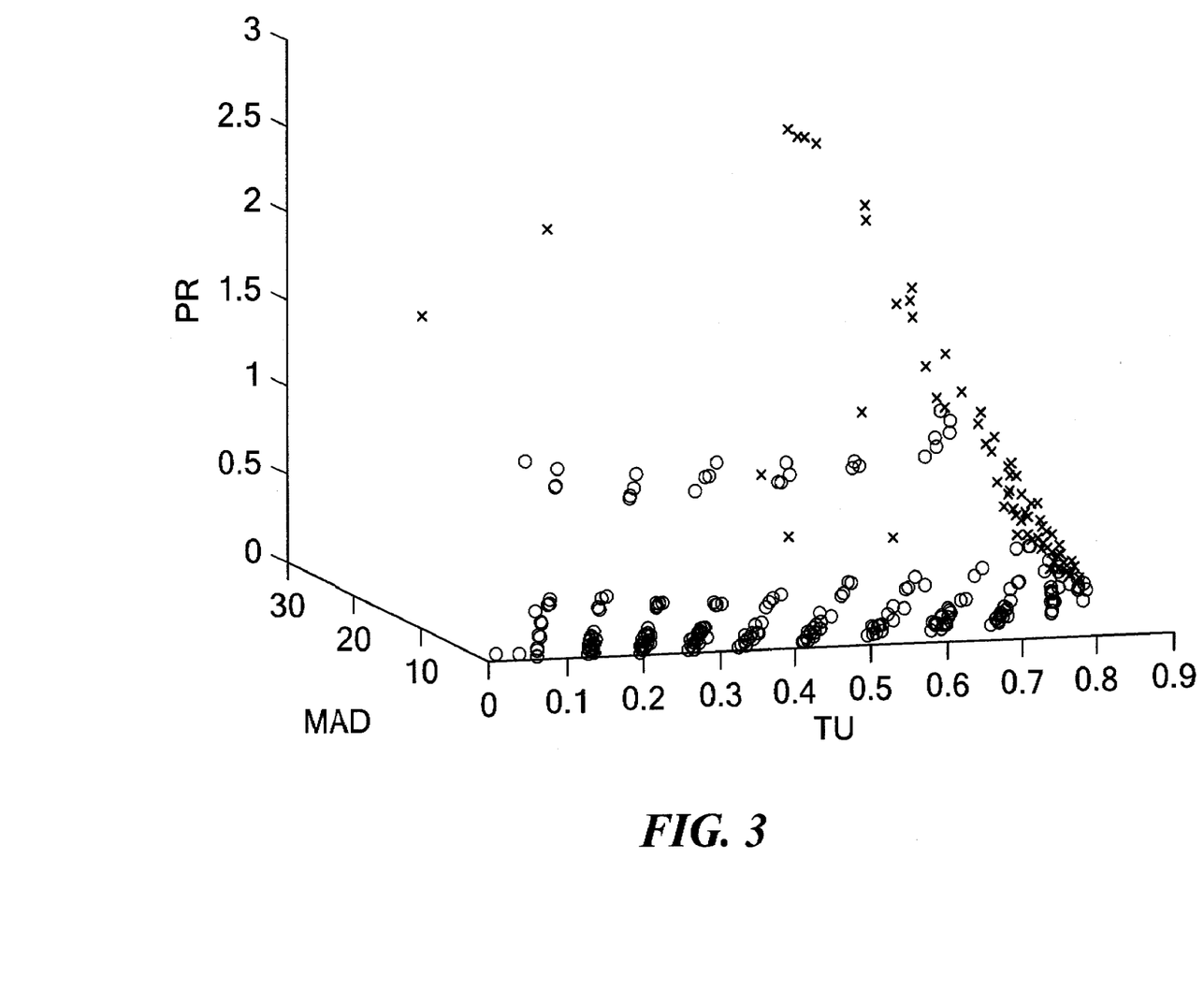
FIG. 3 is a graph showing the relationship between a plurality of measurable features, here: channel time utilization (TU), medium (i.e., channel) access delay (MAD); and number of packet retries (Rt), for a particular congestion rule for a large number of simulated experiments under the various channel conditions and used to generate a mathematical relationship between the degree of packet congestion on the channel and the plurality of measurable features over a plurality of network conditions.

FIGS. 2 and 3 show that it is possible to reliably "separate" operating points before (o) and after (x) saturation. This means that one can define and implement a simple, efficiently computable, formula using the features as inputs in order to predict saturation (e.g. the maximum margin Support Vector Machine (SVM) classifier, to be described in connection with Step 200, below, of the data).

More particularly, FIG. 2 shows TU vs. MAD vs. Rt, under congestion rule given (default in next plots) for a large number of simulated experiments under the various conditions given. Note the good "separation" of operating points before and after saturation in FIG. 2. This indicates possibility to build a simple, efficiently computable, formula using the features as inputs in order to predict saturation. The formula represents a description of the boundary between non-saturation and saturation (e.g. the maximum margin SVM classifier of the data).

FIG. 3 shows a Closeup of a region in FIG. 2 TU vs. MAD vs. Rt, under congestion rule (A)-Zoom in FIG. 2, to highlight separation of saturated (x) and non-saturated experimental points (o) in region of high density of experimental data.

Figure 4:
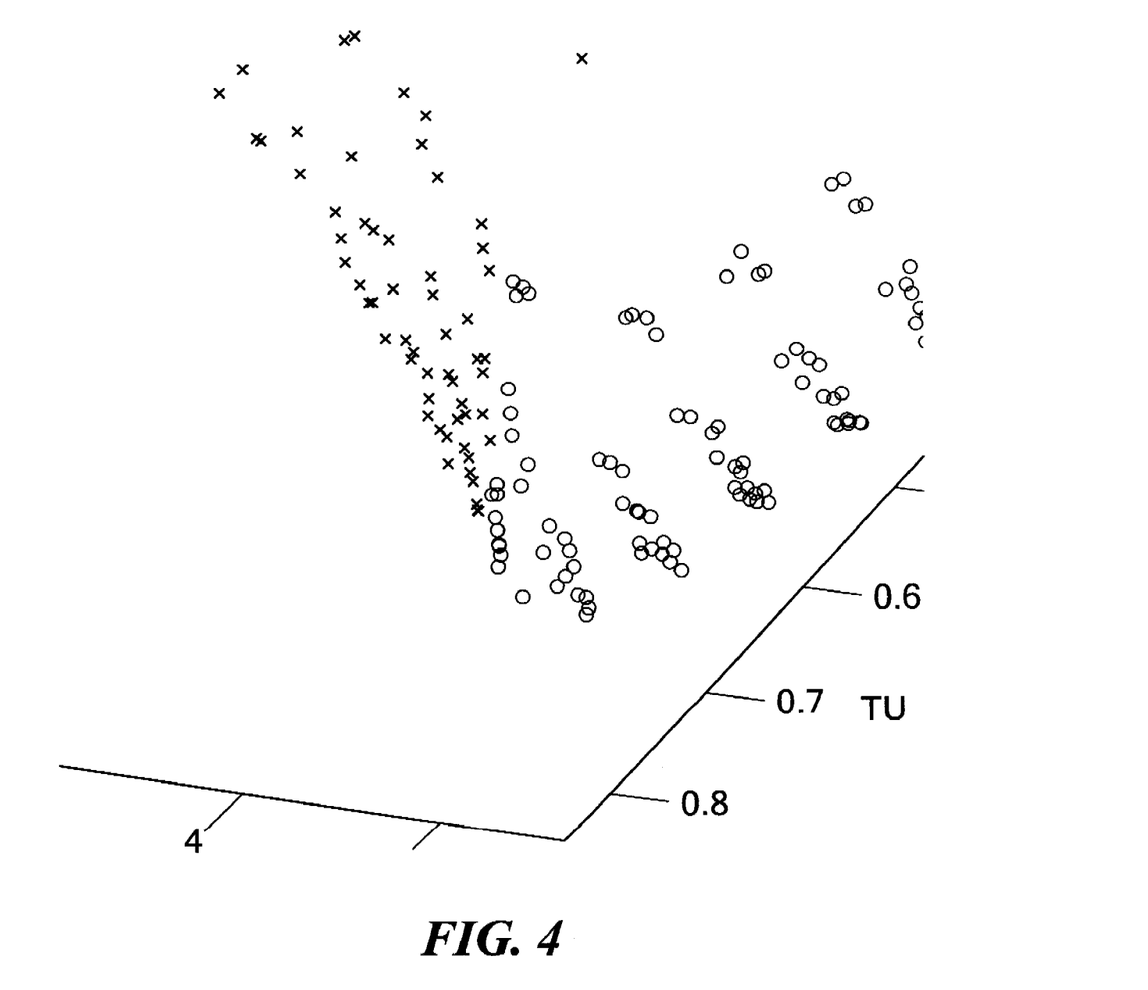
FIG. 4 is an enlarged region of FIG. 3.

FIG. 4 highlights that the operating points are placed on level curves with respect to load, interference or frame error rates. These curves are nicely parameterized with respect to either of these input variables. Furthermore, there is a deterministic, predictable relationship between how close the saturation state is approached, as a function of the position of the operating point relative the boundary of decision regarding saturation. This will allow us to:

Determine that the system approaches saturation

Determine which of noise or congestion or both are main causes of saturation.

More particularly, FIG. 4 shows MAD vs. TU, under congestion rule, in different experimental conditions (Interference, FER). In this plot, each curve (x or o) corresponds to a different FER. The circles/crosses on each curve correspond to experiments with different loads or clients (from L=1 to 15). Note that as FER increases and as L increases, the operation point moves to the right and upwards.

Figure 5:
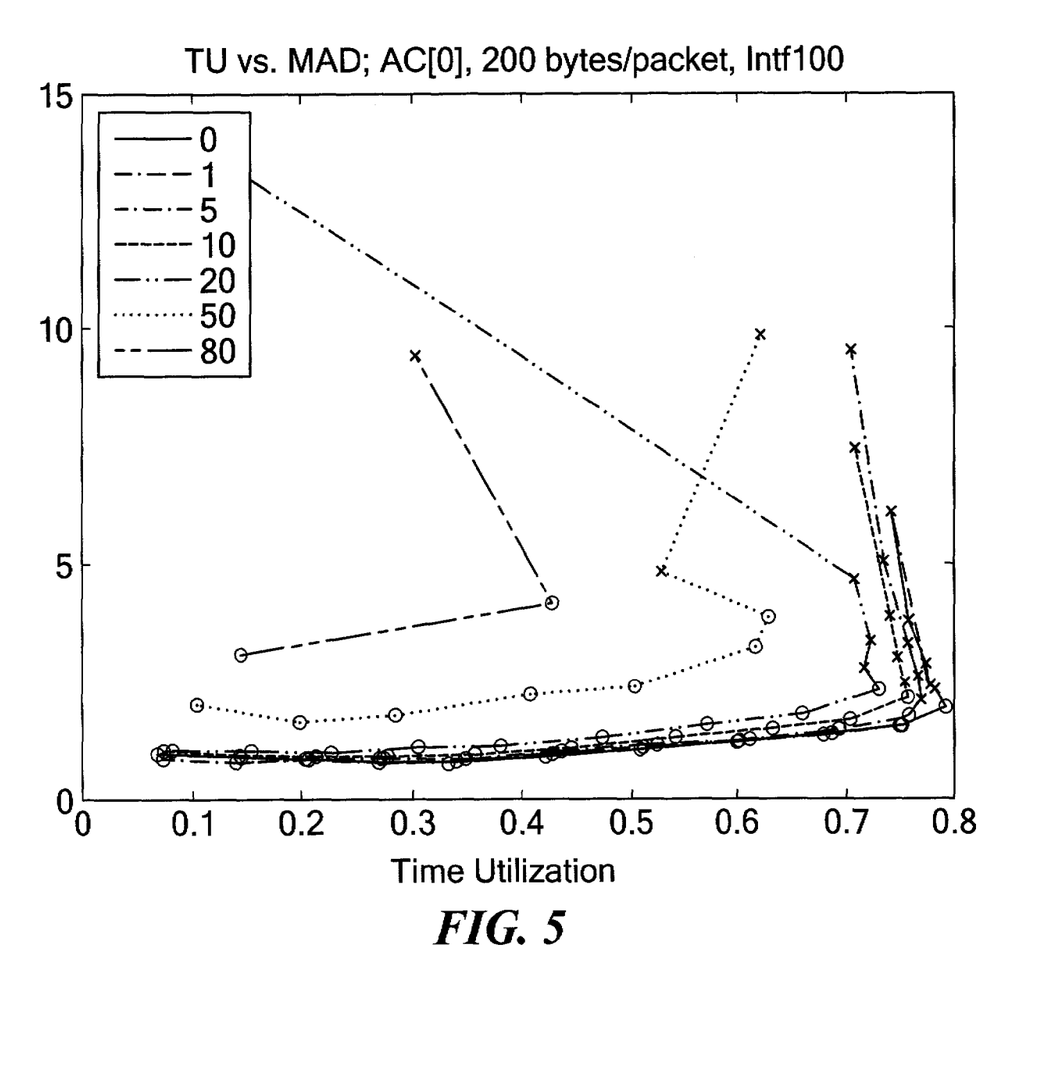
FIG. 5 is a graph showing the relationship between the plurality of measurable features of FIG. 3 for a different congestion rule.

FIG. 5 is a second perspective on MAD vs. TU. One experiment is behind each point (circle or cross) in the plot. All points connected together in one curve correspond to experiments where the number of clients L increases starting from 1. Thus, the first point on the curve, from left to right, is a circle and corresponds to L=1, the second to L=2, and so on (up to maximum L=15 on some curves). For some value of L the circle becomes a cross: this corresponds to an experiment where saturation is reached. Different curves are obtained for various interference levels, as follows: topmost curve, with only three points corresponds to the highest interference level controlled by the frame error rate (FER) of 80%. In the next lower one, the frame error rate is 50%. The following curves are for frame error rates of 20, 10, 5, 2, 1 and zero percent. All points with the same load (number of clients N) constitute a level curve, for various packet error conditions. Note that as FER increases and as N increases, the operation point moves to the right and upwards. That is where all the crosses (corresponding to congested conditions) are concentrated.

Congestion can be predicted based on the position of the operation point in the space of features: as load increases, the operation point moves in the direction of the saturation boundary. Consider for instance a saturation boundary given by the first crosses on the parameterized curves with increasing load. The separation surfaces in these projection subspaces are virtually invariant lines for the various experimental cases (noise and interference).

As indicated, the boundaries can be precisely computed using a classification approach: the training data for the classifier that separates the x and o regions can be created from a large number of simulations. FIGS. 2 and 3 highlight separability of saturated (x) and non-saturated experimental points (o) throughout all experiments.

Generation of Mathematical Relationship

The next step here is to compute a simple, efficiently computable, formula using the features as inputs in order to predict saturation and test the classification power of the formula for various "unseen" cases. Or, as note above, the next step is to generate a mathematical relationship between the degree of packet congestion on the channel and a plurality of measurable features of the network over a plurality of network conditions Note that the operating points are positioned on level curves with respect to load, interference or frame error rates, and the more these conditions worsen (i.e. increased FER, or increased load), the smaller the distance between the position of the operating point and the boundary of decision regarding saturation. The consequences are very important in determining that the system approaches saturation, and determining the cause of saturation: bad channel conditions or congestion or both.

Here, from the data, weights W and p are generated and presented as matrices, more precisely vertical vectors to be described below in Step 300.

A Second Order Support Vector Machine (SVM) Classifier, Step 200

As noted above, during a subsequent normal operating mode, the method periodically measures the plurality of measurable features and applies the generated mathematical relationship to such periodically measured plurality of measurable features to determine actual degree of congestion on the channel; and comparing the actual degree of congestion on the channel with a predetermined channel congestion threshold level.

Here, for example, a $2^{nd}$ order Support Vector Machine based Classifier for the database obtained by the simulation described above is used. The database can be enlarged using a variety of experimental data to obtain an accurate classifier in general or under particular conditions.

Comparison Between Actual Degree of Congestion (Degree of Channel Saturation) with Predetermined Channel Congestion Threshold Level, Step 300

The method next compares the actual degree of congestion on the channel with a predetermined channel congestion threshold level.

The saturation detector has the following form:

$$\text{Saturation} = \begin{cases} \text{false} & \text{if } s(TU, MAD, RT) > \varepsilon \\ \text{true} & \text{if otherwise} \end{cases}$$

$$s(TU, MAD, RT) = [\,TU \quad MAD \quad RT \quad TU^2 \quad MAD^2 \quad RT^2 \quad TU \cdot MAD \quad TU \cdot RT \quad MAD \cdot RT\,]W - \rho$$

where:

s is a saturation parameter providing an indication of the degree of packet congestion; and an instantiation of the coefficients W, $\varepsilon$ and $\rho$ is, in this example, given by:

$W=[-0.1528,-0.9631,0.4933,-0.2066,-0.9802,1.3510,-1.3835,0.1580,2.5935]^T$, $\rho=-7.2384$, $\varepsilon=0$ In practice, the offset parameter $\varepsilon$ can also be experimentally determined. This classifier was here obtained by applying cross-validation on our database of up to 4×15×7=420 examples (in fact there are fewer examples, due to the fact that some experiments have not defined or not-a-number results in the computation of features).

A random subset of approximately 70% was used for training. The following testing results were obtained:

On training database: 99.6% accuracy (241/242 correct classification)

On testing database: 98.97% accuracy (96/97 correct classification)

On entire database: 99.41% accuracy (337/339 correct classification)

Thus, from the above, sufficient relevant computable features for saturation detection have been defined and show feasibility of building a robust classifier based on these features. Under a large set of conditions (FER, interference, there exist invariant separation surfaces in the space of the features of interest, which can be used to robustly detect congestion conditions or proximity to such conditions. The approach presented above gives a heuristic but theoretically informed way of building an effective detector.

The method thus computes a simple, efficiently computable, formula based on the discriminating features as inputs. The formula represents the classification boundary of saturation vs. non-saturation. The saturation boundary is approached under either increasing frame errors or congestion conditions. Furthermore, one can discriminate between the two causes of saturation: bad channel conditions or congestion or both.

A typical instantiation is an implementation of the congestion detection formula in an access point.

It should be understood that the term periodically herein means either at regular or irregular intervals.

Having determined the degree of packet congestion, such degree of congestion being characterized by the saturation parameter, s, a method is used to control or shape packet traffic (herein referred to as a mitigation policy). If the degree of congestion is greater than the determined threshold in Step 400 (FIG. 1), the method adjusts some of the present packet traffic in order to alleviate potential problems (Step 500), here controlling or shaping packet traffic as described in co-pending patent application entitled, "Method and Apparatus to Inspect Wireless Traffic and Mitigate Packet Elimination for Wireless Saturation Avoidance" filed on the same date as this application, and assigned to the same assignee as the present application, the entire subject matter thereof being incorporated herein by reference. On the other hand, if in Step 400 it is determined that the degree of congestion is less than the threshold, the process returns to Step 200.

As described in such co-pending patent application, once the degree of congestion is determined, herein above such degree of congestion being characterized by the saturation parameter, s, the mitigation policy represents action to be taken in each state of the WiSAT state machine, shown in FIG. 6:

The method thus computes a simple, efficiently computable, formula based on the discriminating features as inputs. The formula represents the classification boundary of saturation vs. non-saturation. The saturation boundary is approached under either increasing frame errors or congestion conditions. Furthermore, one can discriminate between the two causes of saturation: bad channel conditions or congestion or both.

A First Order Support Vector Machine Classifier, Step 200

Without loss of generality, one can use other classifiers, such as a different order SVM or other linear or nonlinear machine learning algorithms. In practical instantiations, we used a first order SVM classifier due to the low computational requirements, as follows:

$$s(TU,MAD,RT)=[TU\,MAD\,RT]^T W-\rho$$

where parameters $W=[4.391995-0.005264-0.233946]$, $\varepsilon=0.5$, and $\rho=0.288917$ were learned from real-world experimental data.

A typical instantiation is an implementation of the congestion detection formula in an access point.

It should be understood that the term periodically herein means either at regular or irregular intervals.

Having determined the degree of packet congestion, such degree of congestion being characterized by the saturation parameter, s, a method is used to control or shape packet traffic (herein referred to as a mitigation policy).

If the degree of congestion is greater than the determined threshold in Step 400 (FIG. 1), the method adjusts some of the present packet traffic in order to alleviate potential problems (Step 500), here controlling or shaping packet traffic described below. On the other hand, if in Step 400 it is determined that the degree of congestion is less than the threshold, the process returns to Step 200.

State Machine for WiSAT (Wireless Saturation)

Figure 6:
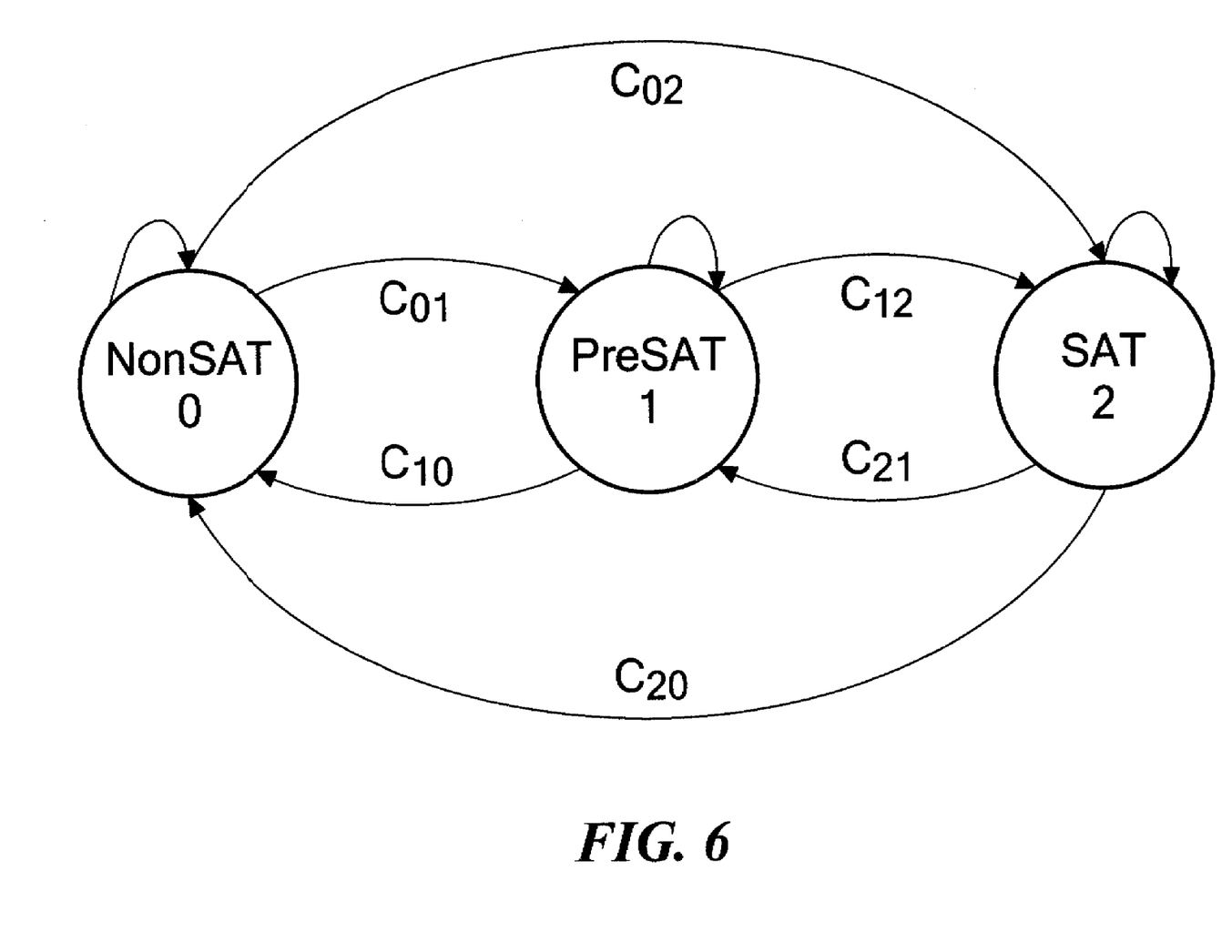
FIG. 6 is a state machine used to perform a method to control or shape packet traffic.

A more complex saturation detector can be modeled using a finite state machine. In contrast to using instantaneous feature values as before to decide on saturation, the decision and actions to be taken depend also on the previous state, or previous measurements. The state machine is called the WiSAT state machine:

Referring now to FIG. 6, a state of WiSAT machine depends on a number of factors.

Classifier and smoothed classifier outputs: s, $\tilde{s}$ respectively; where s is a measure of packet congestion Parameters, e.g. $\alpha_{STATE}$ (smoothing rate for computation of $\tilde{s}$ depending on state s)

Particular statistics/thresholds/intervals for the classifier and smoothed classifier outputs FIG. 6: WiSAT State Machine with state STATE=0/1/2. Conditions Cij guide the transition from state i to state j.

More precisely, the following components are necessary to define the state machine and the logic of the state machine:

Present state STATE (STATE=0 representing NonSAT, or non saturation; 1 representing PreSAT or pre-saturation, and 2 representing SAT or saturation)

Conditions $C_{ij}$ (i,j=0, 1, 2) define transitions between states of the following format:

$$C_{ij}=(s(t)o_{ij}\delta_{ij})r_{ij}(\tilde{s}(t)\tilde{o}_{ij}\tilde{\delta}_{ij})$$

Where:

s(t), $\tilde{s}$(t) are the WiSAT classifier and smoothed classifier outputs $o_{ij}$, $\tilde{o}_{ij}$ are relational parameters $\leq$ and > for s, $\tilde{s}$ respectively $\delta_{ij}$, $\tilde{\delta}_{ij}$ are threshold parameters for s, s respectively $r_{ij}$ is one of the logical relational operators AND, OR Examples (Note that unspecified conditions are defined such that all outgoing transition probabilities from one state add up to 1 and are mutually exclusive. Conditions $C_{ij}$ (i,j=0, 1, 2) are implemented as follows: (with 5 parameters renamed for simplicity of notation $\tilde{\delta}_0=\tilde{\delta}_{01}$, $\delta_0=\delta_{01}$, $\tilde{\delta}_1=\tilde{\delta}_{12}$, $\tilde{\delta}_2=\tilde{\delta}_{21}$ corresponding to above general names)

Examples of Finite State Machine (FSM) State Transition Rules $C_{01} = \tilde{s}(t) > \tilde{\delta}_0$ & $s(t) > \delta_0$
Go from NonSAT (state 0) to PreSAT (state 1) if the time average of the measurement s is greater than the parameter $\tilde{\delta}_0$ and the instantaneous value of s is greater than the parameter $\delta_0$
$C_{01} = \tilde{s}(t) \leq \epsilon$
Go from NonSAT to SAT if the time average of the measurement of s is less than or equal to the value of $\epsilon$
$C_{00} = \tilde{s}(t) \leq \tilde{\delta}_0$ & $\tilde{s}(t) > \epsilon$
Remain in NonSAT if the time average of the measurement of s is less than or equal to $\tilde{\delta}_0$ and the time average of the measurement of s is greater than $\epsilon$
$C_{12} = s(t) \leq \epsilon$
Go from PreSAT to SAT if the instantaneous value of the parameter s is less than or equal to $\epsilon$
$C_{10} = \tilde{s}(t) \leq \tilde{\delta}_1$ & $s(t) > \epsilon$
Go from PreSAT to NonSAT if the time average of the measured parameter s is less than or equal to $\tilde{\delta}_1$ and the instantaneous value of s is greater than $\epsilon$
$C_{11} = \tilde{s}(t) > \tilde{\delta}_1$
Remain in PreSAT if the time average of the measured parameter s is greater than $\tilde{\delta}$
$C_{22} = (s(t) \leq \epsilon)$ & $(\tilde{s}(t) \leq \epsilon)$
Remain in SAT if the instantaneous value of the probability parameter s is less than or equal to $\epsilon$ and the time average of the measured parameter s is less or equal to $\epsilon$
$C_{21} = \tilde{s}(t) > \tilde{\delta}_2$
Go from SAT to PreSAT if the time average of the measured parameter s is greater than $\tilde{\delta}_2$
$C_{20} = \overline{C_{21} | C_{22}}$
Go from SAT to NonSAT if the logical complement of the disjunction of the two conditions C21 and C22 holds

Mitigation

Mitigation policy represents action to be taken in each state of the WiSAT state machine.

NonSAT—no action will be taken.

PreSAT—actions that could be taken include queue length change or dropping (voice) packets, or more generally packets of a given access category, according to one of the algorithms below.

SAT—action could be more drastic, a combination of involving admission control and dropping packets of a given access category (i.e. voice).

Algorithm: Act on Drop Rate N

Parameters:

Max and Min Drop Rate $N_0$, $N_{SAT}$

Critical Threshold $\tilde{\gamma}$

Output: N $$N(t) = \begin{cases} -1 & \text{if } NonSAT \\ N_0 + \beta_2(\tilde{s}(t) - \tilde{\gamma}) & \text{if } PreSAT(\beta_2 \text{ is negative slope}) \\ N_{SAT} & \text{if } SAT \end{cases}$$

where N=−1 means no packet is dropped; otherwise, for N>=0, it means one packet is dropped out of every N consecutive packets; $N_{SAT}$=2 for example.

Note: If saturation does occur, then the last action taken while in PreSAT state could be continuously taken onwards, until a change of state is dictated by the conditions C21/C20.

Other Algorithms. Act on MAC Queue length L

Other algorithm schemes, in addition to scheme 1 above, can be used to achieve similar effects:

Scheme 2. Design virtual queue length, L. Any incoming packet when the virtual queue is full will be dropped Scheme 3. For each client, drop its every (m+1) packet;

Scheme 4. For each client drop the incoming packet if R packets for same client already are in the queue;

For example, scheme 2 proposes to focus on controlling the MAC queue length:

Parameters:

Maximum/Minimum MAC Queue Length $L_0$ $L_{min}$

Critical Threshold $\gamma$

Output: L $$L(t) = \begin{cases} L_0 & \text{if } NonSAT \\ L_0 + \beta_1(\tilde{s}(t) - \gamma) & \text{if } PreSAT(\beta_1 \text{ is negative slope}) \\ L_{min} & \text{if } SAT \end{cases}$$

3. Compendium of WiSAT Parameters

We recommend a parameterized implementation of WiSAT in order to be able to tune parameters of two types, for implementation of the state machine:

Implementation of States

State memory and management s

State smoothing rates $\alpha_0$, $\alpha_1$, $\alpha_2$ s(t)

$\tilde{s}$(t)

N(t) and parameters for computing N: $N_0$, $N_{SAT}$, $\beta_2$, $\gamma$

Implementation of transitions for each state transition (i,j)

$o_{ij}$, $\tilde{o}_{ij}$ relational parameters $\leq$ and > for s(t), $\tilde{s}h(t)$ respectively $\delta_{ij}$, $\tilde{\delta}_{ij}$ threshold parameters for s(t), $\tilde{s}$(t) respectively $r_{ij}$ logical relational operator AND, OR For example, we have performed simulation of the WiSAT and mitigation policies (however with only with simulated decision of mitigation, without really intervening in the control loop to drop any packets) on the example state machine before, with the following parameters:

WiSAT classifier learned using a linear SVM, with features aggregated over periods of 10 readings of 100 msec, i.e. over windows of 1 see;

WiSAT classifier is able to take a decision every 100 msec: therefore the window (time step) W for WiSTATS and decision making is 100 msec WiSAT classifier function: $\alpha=\alpha_0=\alpha_1=\alpha_2=0.1$;

State transition conditions (logic) Cij (i,j=0, 1, 2) given in the example

Classifier distance (WiSAT function) parameters for the state transitions: $\tilde{\delta}_0, \delta_0, \tilde{\delta}_1, \tilde{\delta}_2, \epsilon$ given in the example have the following values:

$\tilde{\delta}_0=2.1, \delta_0=2.1, \tilde{\delta}_1=2.0, \tilde{\delta}_2=1.0, \epsilon=0.5$ N algorithm parameters $N_0=45$, $N_{SAT}=2$, $\beta_2=43/(\tilde{\delta}_1-2.8)$, $\gamma=\tilde{\delta}_1$ A number of embodiments of the invention have been described. Nevertheless, it will be understood that various modifications may be made without departing from the spirit and scope of the invention. Accordingly, other embodiments are within the scope of the following claims.

What is claimed is:

1. A method for measuring a degree of packet congestion on a channel of a packet communication network, comprising:
    simulating a degree of packet congestion on a channel of a packet communication network, the packet communication network having a plurality of measurable features;
    repeatedly varying each of the plurality of measurable features of the packet communication network and simulating the degree of packet congestion on the channel of the packet communication network a predetermined number of times to determine a mathematical relationship between the degree of packet congestion on the channel and each varied measurable feature of the network;
    periodically measuring the plurality of measurable features during a subsequent normal operating mode of the packet communication network; and
    applying the mathematical relationship to the periodically measured plurality of measurable features to determine an actual degree of congestion on the channel of the packet communication network; and
    wherein the actual degree of congestion on the channel is compared to a predetermined threshold;
    wherein packet traffic is controlled or shaped to reduce packet congestion if the actual degree of congestion on the channel exceeds the predetermined threshold; and
    wherein the packet traffic is controlled based on controlling for an average arrival time between two interfering signals and an average duration of interfering signals.

2. The method of claim 1 wherein the degree of packet congestion on the channel is a saturation level of the channel.

3. The method of claim 2 wherein the saturation level is a function of packet arrival rate at a receiver on the channel and total packet throughput on the channel.

4. The method of claim 3 wherein the function is that if there is a set of decreases in the packet arrival rates at each receiver that produces an increase in the total throughput, the channel is at the saturation level of the channel.

5. The method of claim 1 wherein the measurable features of the network comprise at least one of:
    a time delay between transmission starts of a station on the channel and termination of the previously transmitted packet from such station;
    a fraction of time the channel is busy with transmissions, regardless of the origin of the transmission or whether packets were correctly transmitted and received; and
    an average number of packet transmission retries on the channel.

6. The method of claim 1 wherein the packet communication network is an 802.11 wireless network.

7. The method of claim 1 wherein the actual degree of congestion on the channel is compared to a predetermined threshold.

8. The method of claim 7 wherein packet traffic is controlled or shaped to reduce packet congestion if the actual degree of congestion on the channel exceeds the predetermined threshold.

9. The method of claim 1 wherein the measurable features comprise:
    a time delay between transmission starts of a station on the channel and termination of a previously transmitted packet from the station;
    a fraction of time the channel is busy with transmissions; and
    an average number of packet transmission retries on the channel.

10. The method of claim 1 wherein the varied measurable features of the network include at least one of:
    system loading in numbers of client VoIP/Video stream stations;
    channel quality in terms of Frame Error Rate under various corresponding signal-to-noise ratios;
    interference; and
    traffic type.

11. The method of claim 1 wherein packet traffic is controlled by adjusting present packet traffic to mitigate congestion.

12. The method of claim 1 further comprising:
    determining which of noise, congestion, or both noise and congestion are main causes of packet congestions; and
    predicting packet congestion based on a classification approach utilizing a boundary of saturated and unsaturated points throughout all simulations.

13. An access point configured to measure packet congestion, the access point utilizing a method to measure packet congestion comprising:
    simulating a degree of packet congestion on a channel of a packet communication network, the packet communication network having a plurality of measurable features;
    repeatedly varying each of the plurality of measurable features of the packet communication network and simulating the degree of packet congestion on the channel of the packet communication network a predetermined number of times to determine a mathematical relationship between the degree of packet congestion on the channel and each varied measurable feature of the network;
    periodically measuring the plurality of measurable features during a subsequent normal operating mode of the packet communication network; and
    applying the mathematical relationship to the periodically measured plurality of measurable features to determine an actual degree of congestion on the channel of the packet communication network; and
    the actual degree of congestion on the channel is compared to a predetermined threshold;
    packet traffic is controlled or shaped to reduce packet congestion if the actual degree of congestion on the channel exceeds the predetermined threshold; and
    the packet traffic is controlled based on controlling for an average arrival time between two interfering signals at a duration exponentially distributed with an average duration of interfering signals.

14. The access point of claim 13 wherein:
- the degree of packet congestion on the channel is a saturation level of the channel;
- the saturation level is a function of packet arrival rate at a receiver on the channel and total packet throughput on the channel; and
- the function is that if there is a set of decreases in the packet arrival rates at each receiver that produces an increase in the total throughput, the channel is at the saturation level of the channel.

15. The access point of claim 13 wherein packet traffic is controlled by adjusting present packet traffic to mitigate congestion.

16. An access point configured to measure packet congestion, the access point utilizing a method to measure packet congestion comprising:
- simulating a degree of packet congestion on a channel of a packet communication network, the packet communication network having a plurality of measurable features;
- repeatedly varying each of the plurality of measurable features of the packet communication network and simulating the degree of packet congestion on the channel of the packet communication network a predetermined number of times to determine a mathematical relationship between the degree of packet congestion on the channel and each varied measurable feature of the network;
- periodically measuring the plurality of measurable features during a subsequent normal operating mode of the packet communication network; and
- applying the mathematical relationship to the periodically measured plurality of measurable features to determine an actual degree of congestion on the channel of the packet communication network; and
- controlling packet traffic by controlling for an average arrival time between interfering signals and an average duration of interfering signals when the actual degree of congestion is over or at a pre-determined threshold.

17. The access point of claim 16 wherein the method to measure packet congestion further comprises:
- determining which of noise, congestion, or both noise and congestion are main causes of packet congestions; and
- predicting packet congestion based on a classification approach utilizing a boundary of saturated and unsaturated points throughout all simulations.

\* \* \* \* \*